United States Patent [19]

Farrar et al.

[11] Patent Number: 4,592,953

[45] Date of Patent: Jun. 3, 1986

[54] POLYESTER FILM PRIMED WITH CROSSLINKED VINYL ACETATE POLYMERS

[75] Inventors: Grover L. Farrar, Greenville; E. C. Culbertson, Greer, both of S.C.

[73] Assignee: American Hoechst Corporation, Somerville, N.J.

[21] Appl. No.: 560,647

[22] Filed: Dec. 12, 1983

[51] Int. Cl.$^4$ .................. B32B 27/08; B32B 27/36
[52] U.S. Cl. .................. 428/332; 427/393.5; 428/480; 428/483; 524/365
[58] Field of Search .............. 428/483, 480, 332; 524/365; 430/535; 427/393.5

[56] References Cited

U.S. PATENT DOCUMENTS

| | | | |
|---|---|---|---|
| 3,506,445 | 4/1970 | Abbott et al. | 96/87 |
| 3,624,021 | 11/1971 | Barba | 524/365 |
| 3,674,531 | 7/1972 | Shephard et al. | 428/483 |
| 3,720,539 | 3/1973 | Seibel et al. | 117/138.8 F |
| 3,819,773 | 6/1974 | Pears | 428/483 X |
| 4,066,820 | 1/1978 | Kelly et al. | 428/483 |

FOREIGN PATENT DOCUMENTS

| | | |
|---|---|---|
| 1497656 | 1/1978 | United Kingdom . |
| 1497658 | 1/1978 | United Kingdom . |

*Primary Examiner*—Thomas J. Herbert
*Attorney, Agent, or Firm*—James C. Lydon; Michael J. Tully

[57] ABSTRACT

An oriented polyester film coated on one or both sides with a crosslinked vinyl acetate polymer composition which renders the polyester film surface receptive to additional reprographic or matte coatings applied thereto, and to film containing the reclamation product of such coated film.

21 Claims, No Drawings

POLYESTER FILM PRIMED WITH CROSSLINKED VINYL ACETATE POLYMERS

BACKGROUND OF THE INVENTION

Oriented polyester film, particularly biaxially oriented film composed of polyethylene terephthalate (PET), is widely used as a base for drafting film, photographic film and reprographic film, as well as for packaging and labelling applications.

Because PET film is hydrophobic and is not readily receptive to coating, in most applications where the film is to serve as a base or support for other coatings, it must be first coated on one or both sides with a primer coating which adheres to the film and is receptive as well to other coatings applied to it. For example, U.S. Pat. Nos. 2,627,088 and 2,698,240 teach a primer coating for PET film comprising a terpolymer composition of vinylidene chloride, acrylic ester and itaconic acid. This primer layer is said to have excellent adhesion to the polyester surface and to water or alcohol based photographic gelatin layers subsequently coated thereon.

Another known primer is the thermoset acrylic or methacrylic coatings taught in U.S. Pat. No. 3,819,773, which can be applied to the PET film in the plant from aqueous medium. Such a primer layer enhances the adhesion of organic solvent based reprographic and drafting layers applied thereto.

British Patent No. B 1,127,076 teaches the application to PET film of a primer layer which may comprise an aqueous latex of non-crosslinked polyvinyl acetate. The patent indicates that such primer layers render the film heat-sealable. British Patent No. 1,146,215 teaches the application to PET film of a primer coating comprising an aqueous dispersion of a copolymer of vinyl acetate (100 parts), alkyl methacrylate (10 parts) and itaconic acid (6 parts). The patent indicates that the primer provides enhanced adhesion to aqueous based gelatin photographic emulsions, but does not indicate that organic solvent based coatings may be successfully applied thereto. U.S. Pat. No. 3,674,531 discloses the application to PET film of a primer layer comprising a copolymer of a vinylhalogenoester, such as vinyl chloroacetate, which may be copolymerized with numerous different monomers such as acrylic and methacrylic acids, esters and amides, olefins and vinyl alcohol. This copolymer may also be crosslinked such as by the inclusion of a melamine or urea formaldehyde crosslinking agent. The primed PET film is stated to exhibit enhanced adhesion to a variety of coatings applied thereto, including reprographic coatings. U.S. Pat. No. 3,624,021 discloses a matte coating composition for PET film based on a mixture of a vinyl acetate/crotonic acid copolymer and an excess of a urea formaldehyde resin which presumably crosslinks upon the application of heat. British Patent 1,497,657 discloses a similar primer coating for PET film which is based on a mixture of an unhydrolysed polymer or copolymer of vinyl acetate and one or more synthetic resins capable of intra-molecular crosslinking, such as a melamine formaldehyde resin. The patent indicates that the primer layer may serve, inter alia, as an anchor layer for the application of further coatings, such as light-sensitive layers. A similar disclosure is found in U.S. Pat. No. 4,066,820. Other patents disclosing the application of crosslinkable vinyl acetate polymers to various surfaces are found in U.S. Pat. No. 2,553,524 and U.S. Pat. No. 3,307,690.

U.S. Pat. No. 3,720,539 discloses a primer coating system for polyester film comprising a first undercoat based on a composition containing a polyacrylamide or polyvinyl alcohol polymer and having applied over such undercoat a coating comprising a mixture of polyvinyl acetate and a melamine/formaldehyde resin. Although this system adheres well to the film, it is a complicated formulation involving two coating steps and also includes materials such as trichloroacetic acid which are not especially desirable in such coating formulations.

British Patent No. 1,168,171 teaches the application to PET film of a primer layer described as a curable copolymer of an aliphatic unsaturated aliphatic acid and at least one other ethylenically unsaturated monomer. The patent indicates that such a primer coating enhances adhesion to aqueous based gelatin photographic emulsions, but does not indicate that organic solvent based coatings may be successfully applied thereto.

While some of these and other polyester film primer layers are effective in enhancing the adhesive qualities of PET film, it is important for the film manufacturer that scrap film made during production must be recyclable through the film-forming process. Scrap film is normally comminuted, melted, extruded into the form of pellets, mixed with fresh polyester, re-melted and re-fed to the film-forming extruder. Temperatures of about 270° C. to 310° C. may be encountered during such processing of PET reclaim film. Many of the primer compositions discussed above are not stable at such temperatures and tend to impart an undesirable yellow or black discoloration to finished oriented PET film containing significant amounts of such reclaim film, particularly after repeated passes through the extruder. Such is the case with the vinylidene chloride-containing polymers used as PET primer layers and disclosed in U.S. Pat. Nos. 2,627,088 and 2,698,240. It is also the case with primer layers based on copolymers containing vinyl chloroacetate as disclosed in U.S. Pat. No. 3,674,531, as well as primer layers based on a mixture of a vinyl acetate polymer or copolymer and a separately added resinous crosslinking agent such as disclosed in a number of the patents referred to above, or crosslinking agents such as Lewis acids or Werner complexes. It has been found that discoloration and degradation of these primer layers during the reclaim process is most likely attributable to the evolution of chlorine gas or hydrogen chloride in the case of chlorine-containing primer layers, and the relative heat instability of condensation type resinous crosslinking agents such as melamine or urea formaldehyde resins.

Thus, whereas a wide variety of primer coating compositions for PET film are known in the art, the number of such coatings available to the film manufacturer, who requires not only enhanced adhesion to PET film of solvent based coatings applied thereto, but also a primed film which is commercially reclaimable, are limited.

Accordingly, it is an object of this invention to provide an oriented self-supporting polyester film material receptive to organic solvent based coatings.

Another object of this invention is to provide a primer coating for oriented polyester film material which can be safely and easily applied in the plant during production of the film, and to provide a primed film which can be successfully reclaimed in the plant.

SUMMARY OF THE INVENTION

These and other objects of the invention may be achieved by the provision of a prime coated oriented polyester film material wherein the primer coating comprises a crosslinked copolymer containing at least about 50% by weight of vinyl acetate, from about 1% to 15% by weight of a comonomer capable of inter-molecular crosslinking upon the application of heat, and from 0 to about 49% by weight of one or more halogen-free mono-ethylenically unsaturated monomers copolymerizable therewith.

The priming layer may be applied to the polyester film at any suitable stage during manufacture of the film, i.e., before or during the stretching operations, and is crosslinked after application by means of heat. The resultant primed polyester film is found to provide excellent adhesion to many organic solvent based coatings subsequently applied thereto, and to be reclaimable when reprocessed during the manufacture of polyester film without giving rise to significant or intolerable discoloration or degradation of the film.

DETAILED DESCRIPTION OF THE INVENTION

The preferred oriented polyester film base for the purposes of this invention is made from polyethylene terephthalate, although the invention is equally applicable to film based on a crystallizable polyester resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus. For example, the polyester is melted and extruded as an amorphous sheet onto a polished revolving casting drum to form a cast sheet of the polymer. Thereafter, the film is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

The film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range of from about 215° C. and 235° C.

The coating of this invention is preferably applied in the form of an aqueous dispersion or emulsion in line at one of two stages during the film manufacture: the predraw stage at the point between the casting of the amorphous sheet and the first stretch such as disclosed, for example, in British Patent No. 1,411,564 or the interdraw stage subsequent to the uniaxial drawing but prior to biaxial drawing such as disclosed, for example, in U.S. Pat. No. 4,214,035. Normally, the heat applied to the film during the stretching or final conditioning stages is sufficient to evaporate off the water and other volatiles and dry and crosslink the primer coating.

In one preferred embodiment, the primer coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, gravure coating, slot coating or immersion coating. In a preferred embodiment, the polyester film is coated by means of gravure roller coating. Also, the uniaxially drawn film is preferably subjected to a corona discharge by a corona discharge apparatus prior to coating as is known in the art. The discharge treatment decreases the hydrophobic character of the polyester film surface, which permits water based coating to more easily wet the surface and thus improve the adhesion of the coating to the surface.

The vinyl acetate copolymers used as primer layers according to this invention consist essentially of at least about 50% by weight of polymerized vinyl acetate, unhydrolyzed or less than 25% hydrolyzed, and from about 1% to 15% by weight of a copolymerizable comonomer which in its copolymerized state is then capable of inter-molecular crosslinking by the application of heat without the addition of a separate crosslinking agent. Examples of such suitable crosslinking comonomers include N-methylol acrylamide, N-methylol methacrylamide and their corresponding ethers; epoxy materials such as glycidyl acrylate, glycidyl methacrylate and allylglycidyl ether; carboxyl containing materials such as crotonic acid, itaconic acid or acrylic acid; anhydrides such as maleic anhydride or itaconic anhydride; hydroxy containing monomers such as allyl alcohol and hydroxy ethyl or propyl acrylate or methacrylate; amides such as acrylamide, methacrylamide or maleamide; and isocyanates such as vinylisocyanate or allylisocyanate.

Preferred comonomers from the above are N-methylolacrylamide and N-methylolmethacrylamide, mainly because copolymer chains containing one of these monomers are capable of condensing with one another with the aplication of heat to form the desired inter-molecular crosslinking. In the case of copolymers containing the other functional monomers, it is necessary to form blends of two or more copolymers containing different functional comonomers to achieve the desired crosslinking, e.g. blending a vinyl acetate/crotonic acid copolymer with a vinyl acetate copolymer containing isocyanate, epoxide or N-methylol functionality capable of reacting with acidic functional groups.

Specific additional combinations of such blended vinyl acetate copolymers include copolymers containing monomers having epoxide functionality combined with copolymers containing monomers having amine, acid anhydride, carboxyl, hydroxyl or N-methylol functionality; copolymers containing monomers having N-methylol or N-methylol ether functionality combined with copolymers containing monomers having carboxyl, hydroxyl, or amine functionality; copolymers containing monomers having isocyanate functionality combined with copolymers containing monomers having carboxyl or hydroxyl functionality; and so forth. Preferably, the functional monomers present in the mixed copolymer systems are present in approximately equimolar amounts.

The vinyl acetate copolymers also may contain up to about 49% by weight of one or more halogen-free monoethylenically unsaturated monomers interpolymerized therewith. Suitable comonomers include dialkyl maleates such as dioctyl maleate, di-isooctyl maleate and dibutyl maleate; vinyl esters of versatic acid; styrene and styrene derivatives; acrylics such as ethyl acrylate, butyl acrylate, methyl methacrylate, butyl methacrylate and 2-ethylhexylacrylate; acrylonitrile and similar materials.

The preferred crosslinking mixed copolymer compositions for the purposes of this invention are approximately 50/50 blends of a vinyl acetate/crotonic acid copolymer (95 to 5 monomer ratio) with vinyl acetate/glycidylacrylate copolymer (95 to 5 monomer ratio); blends of a vinyl acetate/methacrylamide copolymer (95 to 5 monomer ratio) with a vinyl acetate/N-methylolacrylamide copolymer (95 to 5 monomer ratio); and compositions containing non-mixed copolymers based on copolymers of vinyl acetate with N-methylolacrylamide such as copolymers containing from about 50 to 99% by weight vinyl acetate, 0 to 49% by weight of the mono-ethylenically unsaturated monomer and about 1 to 15% by weight N-methylolacrylamide. More preferred are copolymers containing from more than about 50 up to 90% by weight vinyl acetate, about 5 to 45% by weight of the mono-ethylenically unsaturated monomer, preferably methyl methacrylate, and from about 5 to 10% by weight N-methylolacrylamide.

As pointed out above, the polymeric vinyl acetate primer composition of this invention does not require the presence of an external crosslinking agent such as a melamine or urea/formaldehyde condensate which tends to cause a yellowing of PET film upon reclamation, although in some cases minor amounts of an acidic catalyst may facilitate crosslinking. Thus, the term consisting essentially of as used above is intended to exclude the presence of any significant amounts of such external, separately added crosslinking agents.

The primer coating of the present invention is applied to the base polyester film preferably as an aqueous dispersion or latex and at a solids concentration within the range of about 0.5 to 15%, preferably about 3 to 10%. The preferred solids level is such as to yield a final dry coating thickness within the range of about $10^{-7}$ to $10^{-5}$ inch, which translates into a solids level on a weight basis of from $0.00305 g/m^2$ to $0.305 g/m^2$. The preferred thickness range of the dried copolyester primer is from $6.0 \times 10^{-7}$ to $2.0 \times 10^{-6}$ inch, with $1.0 \times 10^{-6}$ inch being the target thickness. The thickness of the base film to which the coating is applied may range from about 1 to about 10 mils.

The coating may be applied to one or both sides of the film, or it may be applied to one side only, and optionally a different coating may be applied to the opposite side. Additives known in the art may be present in the coating formulation such as anti-static agents, wetting agents, surfactants, pH regulating agents, antioxidants, dyes, pigments, slip agents such as colloidal silica, and the like. Normally, it is desirable to include an ionic surfactant to enhance the wettability of the aqueous coating to the base polyester film thereby further improving adhesion.

The primer coatings of this invention exhibit excellent heat stability and accordingly any scrap primed film made during production can be mixed with fresh polyester, re-melted and re-fed to the film-forming extruder to produce oriented film. The terms "fresh" or "virgin" polyester as used herein refer to polyester which is not itself the reclamation product of finished articles such as film or fiber, but is rather used for the first time in the manufacture of such articles. Such film produced containing from about 5 up to about 70% by weight of scrap primed film, preferably about 50% by weight of both scrap and fresh polyester exhibits good quality, color and appearance with very little if any perceptible degradation of properties due to the presence of the coating impurity. Thus the primed film of this invention offers a distinct commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above. Similar advantages are also present in comparison to the thermoset acrylics containing resinous crosslinking agents as disclosed in U.S. Pat. No. 3,819,773 or the vinyl acetate polymers containing resinous crosslinking agents as disclosed in British Patent No. 1,497,657.

The reextruded film of this invention may contain the coated reclaim film of this invention to the extent that such reextruded film includes up to 1.0% by weight of the crosslinked vinyl acetate coating, more preferably from about 0.01% to 0.50%. The reextruded film may itself serve as a finished film, or as a base film upon which crosslinked vinyl acetate coatings described herein or other primer coatings of the prior art may be applied.

Polyester film primed with the composition of this invention has excellent utility as a film base for the production of photosensitive reprographic films. Such films are prepared by forming a coating on a surface of the primed polyester film of a photosensitive composition comprising an organic solvent solution of a resinous binder containing or impregnated with a light-sensitive diazonium compound, and drying said coating. Resinous binders suitable for this purpose include cellulose acetate butyrate, cellulose acetate, cellulose acetate propionate as well as vinyl polymers such as polyvinyl acetate. Suitable solvents include acetone, methyl ethyl ketone, methyl isobutyl ketone, ethylene glycol monomethyl ether and mixtures thereof. These reprographic coatings and their method of application and use are well known in the art.

Similarly the primed polyester film of this invention forms an excellent substrate for the application of matte coatings which render the film suitable for use as a drawing or drafting material. These matte coatings may be based on compositions comprising a resinous binder and a finely divided particulate material which serves as a "toothing agent" dispersed in organic solvents. The resinous binder may include the resinous materials referred to above as well as acrylic or methacrylic resins. The organic solvents may also include those listed above. Particulate materials include finely divided (less than 10 micron particle size) clays or silica. Other ingredients such as thickeners or dispersing agents may also be present in such matte formulations. Similar matte formulations are disclosed for example in British Patent No. 1,072,122 and U.S. Pat. No. 3,624,021.

Yet another application of the primed film of this invention is as a packaging or label material. The primed films demonstrate improved adhesion to organic solvent based printing inks when compared with unprimed film. These inks may comprise organic solvent dispersions or solutions of pigments and or dyes in combination with acrylic resins or other resins and thickening agents.

Accordingly, the excellent adhesive qualities of polyester film primed with the crosslinked vinyl acetate copolymer layers of this invention to organic solvent based coatings applied thereto renders such film of more universal utility to the manufacturer of finished reprographic, graphic and packaging products.

These adhesive qualities are illustrated in Table 1 using a test employing a conventional organic solvent reprographic lacquer.

Reprographic adhesion (Repro) was evaluated using a lacquer comprising (in parts by weight) 9 parts cellulose acetate butyrate of "20 second" grade dissolved in a mixture of 88 parts ethylene glycol monomethyl ether (methyl cellosolve) and 3 parts methyl ethyl ketone with Rhodamine B dye added for color (3 parts of a 1% Rhodamine B dye in n-butanol). The lacquer was applied to the coated surface of the film by means of a wire-wound bar, Meyer rod No. 70, and cured in an oven for 5 minutes at 60° C. The coating was scored with a cross-hatched pattern by means of scalpel. A strip of adhesive tape (Scotch tape 610) was adhered to the cross-hatched area, rubbed with fingernail to insure intimate contact and then pulled rapidly from the film. The amount of lacquer remaining in the cross-hatched area was expressed as a percentage of the amount remaining, i.e. no lacquer removed =100% adhesion, all lacquer removed =0% adhesion with intermediate adhesion values being assessed in terms of the proportion of lacquer area remaining adhered to the film. The test was done twice on two sheets (total of 4 areas tested) and the adhesion value reported as that of the test area showing the most failure.

Repro adhesion test results demonstrating less than 95% adhesion are not generally considered acceptable, whereas test results demonstrating 100% adhesion are the target standard.

The following examples are illustrative of the invention.

EXAMPLE I

A latex comprising 4.5% by weight solids of a copolymer of 90 weight percent of vinyl acetate, 5 weight percent methyl methacrylate and 5 weight percent of N-methylolacrylamide, 0.5% by weight solids of colloidal silica and an anionic surfactant was applied as a primer coating to polyethylene terephthalate film by the following procedure:

Polyethylene terephthalate polymer was melted and extruded through a slot die onto a casting drum maintained at a temperature of about 20° C. The melt froze to form a cast sheet, was longitudinally stretched at a draw ratio of approximately 3.6:1 while maintained at a temperature of about 80° C.

The longitudinally drawn film was corona treated by a corona discharge apparatus and thereinafter coated with the latex described above by reverse gravure coating.

The corona treated, longitudinally drawn, coated film was dried at a temperature of about 100° C. Thereafter, the film was stretched, in the transverse direction at a draw ratio of 3.6:1 to produce a biaxially drawn film. The biaxially drawn film was heat set at a temperature of 230° C. These heat treatments resulted in the crosslinking of the primer coating. The dry weight of the coating was about 0.035 g/m² with a coating thickness of about $1 \times 10^{-6}$ inch and a base film thickness of about 3 mils.

EXAMPLES 2-8

In the same manner as formulated in Example I, seven additional primer coating formulations within the scope of this invention and having compositions as set forth in Table 1, were coated on polyester film by the techniques set forth above. All final coating thicknesses on a dry weight basis were approximately $1 \times 10^{-6}$ inch.

These primed films were evaluated for adhesion to solvent based lacquers by the test method set forth above. Results are reported in Table 1 as compared with plain unprimed polyethylene terephthalate film (Control).

TABLE 1

| Example | PRIMER COMPOSITION | | | REPRO ADHESION RESULTS |
|---|---|---|---|---|
| 1 | VA(90) | MMA(5) | NMA(5) | 100 |
| 2 | VA(95) | — | NMA(5) | 95 |
| 3 | VA(80) | MMA(15) | NMA(5) | 100 |
| 4 | VA(75) | MMA(20) | NMA(5) | 100 |
| 5 | VA(70) | MMA(25) | NMA(5) | 100 |
| 6 | VA(60) | MMA(35) | NMA(5) | 100 |
| 7 | VA(50) | MMA(45) | NMA(5) | 100 |
| 8 | VA(65) | MMA(25) | NMA(10) | 100 |
| CONTROL | (NO PRIMER) | | | 0 |

NOTE:
VA = vinyl acetate
MMA = methyl methacrylate
NMA = N—methylolacrylamide

The improvement in terms of reclaimability of polyester film primed with the copolymers of this invention as compared with prior art primed films is established with comparative tests by preparing coated film as described above, but in one case (A) coated with an acrylic polymer based on a copolymer of ethyl acrylate, methyl methacrylate and methacrylamide, containing about 20% by dry weight of a resinous melamine/formaldehyde crosslinking agent. In the second case (B) the film is coated with a vinyl acetate copolymer also containing 20% by dry weight of a resinous melamine/formaldehyde crosslinking agent. In both cases 3 mil PET film is coated at a dry thickness of about $1 \times 10^{-6}$ in.

The reclaimability of these two films is evaluated in comparison with the film of Example 4 above (C) by comminuting each coated film sample into the form of a flake, passing the flake through a strand extruder at about 290° C. to melt the flake and cutting the strand extrudate into the form of pellets. The resulting pellets are each blended with 50% by weight of fresh (virgin) polyester also in the form of pellets, and each blend is then reextruded at 290° C. and repelletized three additional times.

A visual evaluation of the relative discoloration of the resulting heat treated pellet samples demonstrates that pellets based on samples A and B are each markedly yellower and darker than those based on sample C.

What we claim is:

1. An oriented self-supporting polyester film having a continuous cross-linked primer coating on one or both sides thereof, said polyester film prepared by melt extruding a substantially amorphous polyester film and thereafter orienting the film by stretching in one or two directions and heat setting the film, said primer coating being applied to said film from an aqueous medium prior to stretching in one direction or subsequent to stretching in one direction but prior to stretching in a mutually perpendicular direction, said primer coating consisting essentially of a substantially halogen-free copolymer of at least about 50 percent by weight of polymerized vinyl acetate, from about 1 to about 15% by weight of a copolymerized N-methylol functional group-containing comonomer which in the copolymerized state is capable of inter-molecular crosslinking by the application of heat, and from about 0 to 49% by weight of one or more halogen-free monoethylenically unsaturate copolymerized monomers.

2. The film of claim 1 wherein said functional group-containing comonomer is selected from the group consisting of N-methylol acrylamide and N-methylolmethacrylamide.

3. The film is claim 2 wherein said monoethylenically unsaturated monomer is present at a level of from about 5 to 45% by weight.

4. The film of claim 3 wherein said monoethylenically unsaturated monomer is methyl methacrylate.

5. The film of claim 2 said functional group-containing comonomer is present at a level of about 5 to 10% by weight.

6. The film of claim 5 wherein said primer coating comprises a copolymer of about 50 to 90% by weight vinyl acetate, about 5 to 45% by weight methylmethacrylate, and from about 5 to 10% by weight N-methylol acrylamide.

7. The film of claim 1 wherein said primer coating has a dry thickness within the range of about $10^{-7}$ to $10^{-5}$ inch.

8. The film of claim 7 wherein said self supporting polyester film is biaxially oriented polyethylene terephthalate film.

9. A biaxially oriented polyester film comprising an intimate mixture of from about 30 to 95% by weight of fresh polyester and corresponding about 70 to 5% by weight of the coated film of claim 8, said coated film characterized in that said coated film is comminuted, melted at a temperature within the range of about 270° C. to about 310° C., and mixed with fresh polyester prior to extruding and biaxially orienting said film.

10. The film of claim 9 containing from about 0.01 to about 1.0% by weight of said coating.

11. The oriented self supporting polyester film of claim 10 which is itself primer coated with a continuous cross-linked coating on one or both sides thereof,
said coating being applied to said film from an aqueous medium prior to stretching in one direction or subsequent to stretching in one direction but prior to stretching in a mutually perpendicular direction,
said coating consisting essentially of a substantially halogen-free copolymer of at least about 50 percent by weight of polymerized vinyl acetate, from about 1 to about 15% by weight of a copolymerized N-methylol functional group-containing comonomer which in the copolymerized state is capable of inter-molecular crosslinking by the application of heat, and from about 0 to 49% by weight of one or more halogen-free monoethylenically unsaturated copolymerized monomers.

12. The film of claim 11 wherein said primer coating has a dry thickness within the range of about $10^{-7}$ to $10^{-5}$ inch.

13. The film of claim 12 wherein said self supporting polyester film is biaxially oriented polyethylene terephthalate film.

14. A light-sensitive film comprising the film of claim 13 having a light-sensitive layer comprising a resinous binder containing or impregnated with a light-sensitive diazonium salt applied directly to said primer coating.

15. A graphic film comprising the film of claim 13 having a matte layer comprising a resinous binder containing a finely divided particulate material applied directly to said primer coating.

16. The film of claim 13 having a printing ink composition applied directly to at least a portion of said primer coating.

17. The film of claim 11 wherein said functional group-containing comonomer is selected from the group consisting of N-methylol acrylamide and N-methylol-methacrylamide.

18. The film of claim 17 wherein said functional group-containing comonomer is present at a level of about 5 to 10% by weight.

19. The film of claim 17 wherein said monoethylenically unsaturated monomer is present at a level of from about 5 to 45% by weight.

20. The film of claim 19 wherein said primer coating contains about 5 to 10% by weight of N-methylol acrylamide.

21. The film of claim 19 wherein said monoethylenically unsaturated monomer is methyl methacrylate.

* * * * *